United States Patent [19]

Macaigne et al.

[11] Patent Number: 4,624,899

[45] Date of Patent: Nov. 25, 1986

[54] NOVEL ORGANOPOLYSILOXANE COMPOSITIONS USEFUL AS MOLD RELEASE COATINGS

[75] Inventors: Louis Macaigne, Mezieres sur Seine; Jean-Marie Pouchol, Lyons, both of France

[73] Assignee: Rhone-Poulenc Specialites Chimiques, Courbevoie, France

[21] Appl. No.: 811,285

[22] Filed: Dec. 20, 1985

[30] Foreign Application Priority Data

Dec. 20, 1984 [FR] France .................................. 84 19510

[51] Int. Cl.$^4$ .......................... B32B 9/04; C08K 5/54
[52] U.S. Cl. .................................... 428/447; 524/268; 106/38.22
[58] Field of Search ........................ 524/268; 428/447; 106/38.22

[56] References Cited

U.S. PATENT DOCUMENTS

| | | | |
|---|---|---|---|
| 2,811,408 | 10/1957 | Braley | 427/133 |
| 3,047,917 | 8/1962 | McCarter et al. | 106/38.22 |
| 3,684,756 | 8/1972 | Brooks | 106/38.22 |
| 3,739,836 | 6/1973 | Scott | 106/38.22 |
| 3,883,628 | 5/1975 | Martin | 106/38.22 |

*Primary Examiner*—Lewis T. Jacobs
*Attorney, Agent, or Firm*—Burns, Doane, Swecker & Mathis

[57] ABSTRACT

Novel organopolysiloxane compositions, well adopted for use as mold release coatings, are comprised of (A) a particular diorganopolysiloxane oil containing methyl, phenylalkyl or alkyl radicals having from 7 to 15 carbon atoms, (B) an MQ organopolysiloxane copolymer resin, and (C) an inert organic diluent therefor.

6 Claims, No Drawings

NOVEL ORGANOPOLYSILOXANE COMPOSITIONS USEFUL AS MOLD RELEASE COATINGS

BACKGROUND OF THE INVENTION

1. Field of the Invention:

The present invention relates to novel compositions which are useful for the release treatment of mold walls. The present invention more especially relates to novel such compositions comprising organopolysiloxane polymers which are applied as non-stick coatings and thereby facilitate the demolding of molded shaped articles consisting of organic materials such as rubbers, resins, plastics and cellular materials.

The advantage of these organopolysiloxane polymers is that they do not interfere with the gluing, painting or varnishing of the molded final products. They also have the advantage of efficiently adhering to the materials of which the molds are made; as a result of this, a large number of demoldings can be carried out before the mold wall members need to be treated again.

2. Description of the Prior Art:

Organopolysiloxane polymers have long been used to facilitate the demolding of shaped articles made of organic materials. Despite their non-stick nature, some of these compounds allow the molded products to be subsequently painted. Same are described, in particular, in French Pat. Nos. 1,340,398, 1,448,165 and 1,499,845.

French Pat. No. 1,340,398 describes diorganopolysiloxanes consisting of 10 to 90 mole % of units of the formula $(C_6H_5X)CH_3SiO$ and 10 to 90 mole % of units of the formula $CH_3(X')SiO$ in which X is an alkylene radical containing 2 to 3 carbon atoms and X' an alkyl radical also containing from 2 to 3 carbon atoms.

French Pat. No. 1,448,165 relates to diorganopolysiloxanes consisting of units of the formula $CH_3(Y)SiO$ and optionally of units of the formula $CH_3(Y')SiO$ in which Y is an alkyl radical containing from 8 to 20 carbon atoms and Y' is an alkyl radical containing from 1 to 7 carbon atoms.

French Pat. No. 1,499,845 describes diorganopolysiloxanes consisting of units of the formula $CH_3(Z)SiO$ and of units of the formula $CH_3(Z')SiO$, in which Z is an alkyl radical containing at least 7 carbon atoms and Z' is a 2-phenylethyl radical.

Another French Pat. No. 1,570,178, relates to the use, for demolding polyurethane foams, of diorganopolysiloxanes having a structure closely akin to those of the diorganopolysiloxanes above described. In fact, they consist of at least 50 mole % of units of the formula $CH_3(W)SiO$, at most 40 mole % of units of the formula

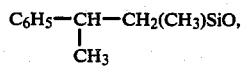

or of the formula $C_6H_5CH_2CH_2(CH_3)SiO$ and at most 10 mole % of units of the formula $CH_3(W')SiO$, formulae in which W is an alkyl radical containing from 3 to 30 carbon atoms, W' is a methyl, ethyl, phenyl or benzyl radical, or a polyether chain; and at each end of their polymer chains they terminate in a hydroxy radical, or a triorganosiloxy moiety.

These diorganopolysiloxanes are deposited in a liquid form onto the wall members of the mold after each demolding; prior to such deposition, however, a conventional mold-release agent such as a wax, a silicone resin or a silicone rubber must be preliminarily applied thereto.

The diorganopolysiloxanes described in the aforenoted French Pat. Nos. 1,340,398, 1,448,165, 1,499,845 and 1,570,178, do not appear to interfere with the painting or gluing of the molded final products; however, they have the disadvantage of not adhering efficiently to mold walls, and as a result of this their application to these walls must be frequently renewed during the molding/demolding cycles.

Organopolysiloxanes having another structure are described in U.S. Pat. No. 2,811,408. These are copolymers consisting of $(CH_3)_3SiO_{0.5}$ and $SiO_2$ units, distributed such as to provide a $CH_3/Si$ ratio of 1 to 2.5; they are optionally combined with either straight or branched chain organopolysiloxanes. The patent teaches the use of these polymers for efficient demolding of organic or organosilicone materials. It does not teach the means to be employed to ensure that the molded products can subsequently be painted.

SUMMARY OF THE INVENTION

Accordingly, a major object of the present invention is the provision of a novel class of compositions comprising organopolysiloxane polymers having non-stick properties and displaying all of the properties of adhering well to the wall members of molds and of permitting the subsequent painting and gluing of the molded shaped articles.

Briefly, the subject novel compositions, well adopted for the release treatment of mold walls, comprise:

(A) 100 parts of a diorganopolysiloxane oil having the average general formula:

in which the symbols R, which are identical or different, are each an alkyl radical containing from 7 to 15 carbon atoms, or a phenylalkyl radical in which the alkyl moiety contains from 1 to 6 carbon atoms, and preferably 2 and 3 carbon atoms; the symbol G has the same meaning as the symbol R, or is a hydroxy radical or a methyl radical; the symbol x is any number $\geq 6$; the symbol y is zero or any number which does not exceed $\frac{3}{4}$ of the value of the symbol x, the sum of $x+y$ having a sufficient value to provide a viscosity of 50 to 5,000 mPa.s at 25° C.;

(B) 15 to 80 parts of an organopolysiloxane copolymer comprising recurring units of the formula:

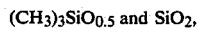

which are distributed such that their molar ratio $(CH_3)_3SiO_{0.5}/SiO_2$ ranges from 0.4 to 1.2;

(C) 200 to 2,000 parts of organic diluents which are inert towards the constituents (A) and (B).

DETAILED DESCRIPTION OF THE INVENTION

More particularly according to the present invention, the diorganopolysiloxane oils (A) comprise a series of $OSi(CH_3)R$ recurring units and optionally of $OSi(CH_3)_2$ recurring units and the ends of the polymer chains are blocked or terminated by $G(CH_3)_2SiO_{0.5}$ moieties. A small amount of other units originating, for example, from the by-products formed during the preparation of the oils (A) is not precluded; thus, units of the formulae $SiO_2$, $CH_3(H)SiO$ and $CH_3SiO_{1.5}$ may be present, in a proportion not exceeding 2% of the total of the units which constitute the oils (A).

The alkyl radicals which are included in the definition of the symbol R and which contain from 7 to 15 carbon atoms, may be linear or branched. n-Heptyl, n-octyl, n-decyl, n-dodecyl, n-tetradecyl and n-pentadecyl radicals are representative of the linear radicals.

2-Ethylhexyl, 3-methyloctyl, 3-methyldodecyl and 4-n-butyldecyl radicals are representative of the branched radicals.

Exemplary phenylalkyl radicals, also included within the definition of the symbol R, are 2-phenylethyl, 2-phenyl-n-propyl, 2-phenylisopropyl, 4-phenyl-n-butyl and 6-phenyl-n-hexyl radicals.

The symbol x denotes a whole or fractional number $\geq 6$, preferably $\geq 8$. The symbol y denotes zero or a whole or fractional number which does not exceed $\frac{3}{4}$, preferably $\frac{2}{3}$, of the value of x; and the sum of x+y is a value such that the viscosity of the oil ranges from 50 to 5,000 mPa.s at 25° C., preferably 100 to 4,500 mPa.s at 25° C.

Oils having the following formulae are representative of the oils (A) which are included in the above-mentioned general formula:

P1: $(CH_3)_3Si[OSi(CH_3)\text{n-octyl}]_{x1}OSi(CH_3)_3$
P2: $(CH_3)_3Si[OSi(CH_3)CH_2CH_2C_6H_5]_{x2}OSi(CH_3)_3$
P3: $(CH_3)_3Si[OSi(CH_3)\text{2-ethylhexyl}]_{x3}OSi(CH_3)_3$
P4: $(CH_3)_3Si[OSi(CH_3)\text{n-decyl}]_{x4}[OSi(CH_3)\text{n-tetradecyl}]_{x5}[OSi(CH_3)CH_2CH(CH_3)C_6H_5]_{x6}OSi(CH_3)_3$
P5: $(CH_3)_2\text{n-octyl Si}[OSi(CH_3)\text{n-octyl}]_{x7}[OSi(CH_3)_2]_{y1}OSi\,\text{n-octyl}(CH_3)_2$ Each of the symbols x1 to x7 and y1 reflects a value such that the polymers P1 to P5 have the following viscosities, in mPa.s at 25° C.:

| P1: 400 to 900; | P2: 500 to 950; |
|---|---|
| P3: 300 to 800; | P4: 600 to 1,200; |
| P5: 450 to 1,000. | |

The preparation of the oils (A) is well known to this art. In the majority of cases it consists of reacting an organohydropolysiloxane with the olefin compound(s) selected, in the presence of a platinum-based catalyst.

The organohydropolysiloxane, for example, may have the general formula:

$(CH_3)_3Si[OSi(CH_3)H]_x[OSi(CH_3)_2]_yOSi(CH_3)_3$

It may also have the general formula:

$H(CH_3)_2Si[OSi(CH_3)H]_x[OSi(CH_3)_2]_yOSi(CH_3)_2H$

In these formulae, the symbols x and y have the same meaning as that given above in the description of the general formula of the oils (A).

The conditions for such addition reaction are noted, in particular, in French Pat. Nos. 1,448,165, 1,461,931, 1,499,845 and 1,570,170.

A method other than that entailing use of an addition reaction is preferably employed to prepare the oils (A) which are blocked at each end of the polymer chain by a hydroxy radical bonded to the silicon atom. It is possible to begin with organochlorosilanes of the formula $R(CH_3)SiCl_2$, optionally mixed with $(CH_3)_2SiCl_2$; these are hydrolyzed and the hydrolysates are rearranged in the presence of an acid catalyst such as trifluoromethanesulfonic acid, or a basic catalyst such as potassium hydroxide.

The preparation of organochlorosilanes of the formula $R(CH_3)SiCl_2$ may be carried out by the addition of a silane of formula $H(CH_3)SiCl_2$ to an olefin providing the radical R, in the presence of a platinum derivative. The symbol R in the formula $R(CH_3)SiCl_2$ is the same as that given above in the general formula of the oils (A).

The organopolysiloxane copolymers (B), which are generally referred to as MQ resins, are introduced into the compositions according to the invention in a proportion of 15 to 80 parts, preferably 17 to 75 parts, per 100 parts of the oils (A); they comprise $(CH_3)_3SiO_{0.5}$ and $SiO_2$ units, whose molar ratio $(CH_3)_3SiO_{0.5}/SiO_2$ ranges from 0.4/1 to 1.2/1, preferably 0.45/1 to 1.1/1. They are commercially available from silicone producers and may easily be manufactured by methods well known to this art.

In particular, they can be prepared:

(i) from trimethylchlorosilane and/or hexamethyldisiloxane, and sodium silicate, according to the process described in French Pat. No. 1,046,736, (ii) or from trimethylchlorosilane and ethyl silicate, according to the process described in French Pat. No. 1,134,005.

The preparative procedure is carried out in inert diluents and the copolymers are maintained in these diluents. It is possible, nevertheless, to replace all or a portion of the diluents employed during their preparation, by other diluents having higher boiling points.

The following are representative of suitable diluents:

(i) halogenated or unhalogenated aromatic hydrocarbons, such as toluene, xylene, cumene, chlorobenzene and orthodichlorobenzene;

(ii) halogenated or unhalogenated aliphatic hydrocarbons, such as heptane, cyclohexane, methylcyclohexane, trichloroethylene, perchloroethylene, trichloroethane and tetrachloroethane;

(iii) petroleum cuts consisting of aliphatic and/or aromatic hydrocarbons boiling, for example, between 90° C. and 280° C. at atmospheric pressure;

(iv) aliphatic or aromatic esters such as n-butyl acetate.

The copolymers (B) may be present in the diluents in any proportion, but it is recommended that solutions containing from 30 to 75% by weight of the copolymers are used. These copolymers have a variable concentration of hydroxy radicals bonded to silicon atoms; in general, this concentration ranges from 0.1 to 6%; copolymers with concentrations of 0.5 to 5% are preferably employed.

A portion of the copolymers (B) may be modified by the introduction of vinyl-containing units of the formula $$CH_2=CH(CH_3)_aSiO_{\frac{3-a}{2}},$$

the symbol a being 1 or 2.

The amount of vinyl-containing units which is introduced is such that it represents 0.2 to 8%, preferably 0.3 to 7%, of the weight of the copolymers (B) which are modified and which thus include the units

the molar ratio $(CH_3)_3SiO_{0.5}/SiO_2$ always having the above-mentioned value, that is to say, ranging from 0.4 to 1.2.

These modified copolymers (B), referred to as copolymers (B1) hereinafter, may be prepared by the processes heretofore described for the preparation of the copolymers (B); it is essential, however, to add the chlorosilane of the formula $CH_2\!=\!CH(CH_3)_2SiCl$, or that of the formula $CH_2\!=\!CH(CH_3)SiCl_2$ to the various reactants.

The copolymers (B1) are stored in inert diluents at a concentration which is identical to that recommended for the copolymers (B), that is to say, from 30 to 75% by weight; they may also contain hydroxy radicals which are bonded to silicon atoms, in a concentration on the order of 0.1 to 6%.

The diluents (C) are employed in a proportion of 200 to 2,000 parts, preferably 250 to 1,950 parts, per 100 parts of the oils (A); they are well-known organic compounds, of low toxicity or nontoxic and inert towards the oils (A) and the copolymers (B) and/or (B1); they may be identical to the diluents which have already been mentioned and which are used for the preparation and dilution of the copolymers (B) and/or (B1).

The organopolysiloxane compositions according to the invention are prepared by merely mixing, in any order, the oils (A), the copolymers (B) and/or (B1) and the diluents (C).

The copolymers (B) and/or (B1) are preferably incorporated in their dilute form. In this case, the diluents (C) are supplemented such as to provide the required quantities, that is to say, 200 to 1,000 parts of diluents (C) per 100 parts of the oils (A) and 15 to 80 parts of the copolymers (B) and/or (B1).

The diluents may be removed from the dilute solutions of the copolymers (B) and/or (B1) by first mixing the oils (A) with these dilute solutions and then removing the diluents by heating at a pressure below atmospheric pressure; the operation must be carried out with care, however, to avoid the formation of gel particles.

The compositions according to the invention are stable in storage for at least 1 year in closed containers. These compositions, which are, in fact, solutions of the polymers (A) and (B) and/or (B1) in the diluents (C), may be employed as such. They may also be used in a more dilute state, produced by adding further amounts of diluents. In this case, the concentration of the polymers (A) and (B) and/or (B1) at the time when the solutions are applied to the mold walls can vary, as a result, over a wide range of values, for example, from 0.1% to 80% by weight.

The application to mold wall members is carried out by means of the usual methods, such as spraying, impregnation by brushing, or with a pad, etc. The amount of the polymers (A) and (B) which is deposited after the diluents have evaporated should be sufficient to ensure the formation of a uniform coating having a thickness on the order of 0.1 to 10 $\mu$m, preferably 0.2 to 8 $\mu$m.

Mold walls coated in this manner (which are fabricated from relatively nondeformable materials such as metals and reinforced resins) may be employed for molding a very wide variety of materials, such as epoxy resins, polyesters, silicones, polyamides, polycarbonates, polyurethanes, melamine/formaldehyde resins, polyurethane foams and phenolic foams.

The final products which are molded in the above molds can be easily painted or varnished; the deposited coatings spread uniformly and continuously on the surfaces of the molded products. Furthermore, assembly of the molded products by gluing, to each other or to other organic materials, may be carried out without difficulty; thus, synthetic or natural rubber plates can be glued to plates molded from polyurethane resins.

In order to further illustrate the present invention and the advantages thereof, the following specific example is given, it being understood that same is intended only as illustrative and in nowise limitative.

EXAMPLE

The following materials were introduced into a reactor:

(i) 20 parts by weight of a xylene solution containing 60% of a resinous organopolysiloxane copolymer comprising recurring units of the formulae $(CH_3)_3SiO_{0.5}$ and $SiO_2$, whose molar ratio $(CH_3)_3SiO_{0.5}/SiO_2$ is about 0.6 and which contained 2.5% by weight of hydroxy radicals bonded to silicon atoms;

(ii) 20 parts by weight of a methyl(n-octyl)polysiloxane oil blocked at each end of its polymer chain by a trimethylsiloxy group, having a viscosity of 750 mPa.s at 25° C.; and (iii) 60 parts by weight of 1,1,1-trichloroethane.

The entire mass was stirred for 10 minutes at ambient temperature. The solution obtained was clear and it remained in this state after being permitted to stand for 12 months in a closed container.

This solution, which contained approximately 32% of organopolysiloxane polymers, was diluted with 1,1,1-trichloroethane, such as to provide a solution containing 16% of polymers. The dilute solution was sprayed onto the walls of a mold made of tinned steel, 300 ml in capacity. It was permitted to dry in the open air for 10 minutes; a thin coating, approximately 8 to 10 $\mu$m in thickness remained.

A composition consisting of a mixture of 71 g of a technical grade p,p'-diisocyanatodiphenylmethane containing 30% by weight of $N\!-\!C\!=\!O$ groups and 51.6 g of a premix containing hydroxy radicals was cast into the mold. The premix was prepared from:

(1) 100 g of a sucrose-derived polyol having a hydroxyl index of 400;

(2) 0.2 g of water;

(3) 1.1 g of a 33% strength solution of triethylenediamine in dipropylene glycol;

(4) 1 g of dimethylethanolamine; and (5) 1 g of a stabilizer of the polydimethylsiloxanepolyalkylene glycol block copolymer type.

The composition expanded freely in the mold and was converted into a rigid foam having a density of 0.35 g/ml.

The demolding was carried out 30 minutes after pouring of the composition began. The same molding-/demolding operation was repeated and it was determined that 6 molded rigid foam articles were produced before sticking to the mold walls began to take place.

A layer of a glyptal paint, approximately 20 $\mu$m in thickness, was deposited, by spraying, onto the surfaces of the molded articles; no paint spreading fault was observed and the paint covered the surface of the molded articles completely and uniformly.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organopolysiloxane composition comprising:
   (A) 100 parts of a diorganopolysiloxane oil of the average general formula:

$$G(CH_3)_2Si[OSi(CH_3)R]_x[OSi(CH_3)_2]_yOSi(CH_3)_2G$$

in which the symbols R, which are identical or different, are each an alkyl radical containing from 7 to 15 carbon atoms, or a phenylalkyl radical, the alkyl moiety of which contains from 1 to 6 carbon atoms; the symbol G is R or a hydroxy or methyl radical; the symbol x is any number $\geq 6$; the symbol y is zero or any number which does not exceed $\frac{3}{4}$ of the value of x, with the sum x+y being such that said oil has a viscosity of 50 to 5,000 mPa.s at 25° C.;
   (B) 15 to 80 parts of an organopolysiloxane copolymer comprising recurring units of the formulae $(CH_3)_3SiO_{0.5}$ and $SiO_2$, distributed such that the molar ratio $(CH_3)_3SiO_{0.5}/SiO_2$ ranges from 0.4 to 1.2; and
   (C) 200 to 2,000 parts of an inert organic diluent.

2. The organopolysiloxane composition as defined by claim 1, wherein said oil (A) comprises an oil having one of the formulae:
   P1: $(CH_3)_3Si[OSi(CH_3)n\text{-octyl}]_{x1}OSi(CH_3)_3$
   P2: $(CH_3)_3Si[OSi(CH_3)CH_2CH_2C_6H_5]_{x2}OSi(CH_3)_3$
   P3: $(CH_3)_3Si[OSi(CH_3)2\text{-ethylhexyl}]_{x3}OSi(CH_3)_3$
   P4: $(CH_3)_3Si[OSi(CH_3)n\text{-decyl}]_{x4}[OSi(CH_3)n\text{-tetradecyl}]_{x5}[OSi(CH_3)CH_2CH(CH_3)C_6H_5]_{x6}OSi(CH_3)_3$
   P5: $(CH_3)_2n\text{-octyl } Si[OSi(CH_3)n\text{-octyl}]_{x7}[OSi(CH_3)_2]_yOSi n\text{-octyl}(CH_3)_2$ in which formulae each of the symbols x1 to x7 and y1 is a value such that the polymers P1 to P5 have the following viscosities, in mPa.s at 25° C.:

| P1: 400 to 900; | P2: 500 to 950; |
   |---|---|
   | P3: 300 to 800; | P4: 600 to 1,200; |
   | P5: 450 to 1,000. | |

3. The organopolysiloxane composition as defined by claim 1, said copolymer (B) comprising vinyl-containing units of the formula:

$$CH_2\!=\!CH(CH_3)_aSiO_{\frac{3-a}{2}},$$

wherein the symbol a is 1 or 2, the amount of said vinyl-containing units ranging from 0.2 to 8% of the weight of said copolymer (B), said copolymer (B) thus comprising the recurring units $$(CH_3)_3SiO_{0.5}, SiO_2 \text{ and } CH_2\!=\!CH(CH_3)_aSiO_{\frac{3-a}{2}},$$

with the molar ratio $(CH_3)_3SiO_{0.5}/SiO_2$ ranging from 0.4/1 to 1.2/1.

4. A mold form, the wall members thereof being provided with non-stick release coatings of the organopolysiloxane composition as defined by claim 1.

5. The mold form as defined by claim 4, said inert organic diluent having been evaporated from said organopolysiloxane composition.

6. The mold form as defined by claim 5, said release coatings being essentially uniform and having a thickness ranging from about 0.1 to 10 μm.

* * * * *